US010301016B1

(12) United States Patent
Bondarev et al.

(10) Patent No.: US 10,301,016 B1
(45) Date of Patent: May 28, 2019

(54) STABILIZED VTOL FLYING APPARATUS AND AIRCRAFT

(71) Applicants: Dmitriy Bondarev, Balashikha (RU); Timofey Rakhin, Moscow (RU); Evgenii Borisov, Moscow (RU)

(72) Inventors: Dmitriy Bondarev, Balashikha (RU); Timofey Rakhin, Moscow (RU); Evgenii Borisov, Moscow (RU)

(73) Assignee: Vimana, Inc., Tortola (VG)

( * ) Notice: Subject to any disclaimer, the term of this patent is extended or adjusted under 35 U.S.C. 154(b) by 572 days.

(21) Appl. No.: 15/232,002

(22) Filed: Aug. 9, 2016

(51) Int. Cl.
| | |
|---|---|
| *B64C 15/12* | (2006.01) |
| *B64C 29/00* | (2006.01) |
| *B64C 39/02* | (2006.01) |
| *B64C 5/16* | (2006.01) |
| *B64C 9/12* | (2006.01) |
| *B64C 25/52* | (2006.01) |

(52) U.S. Cl.
CPC ............ *B64C 29/0033* (2013.01); *B64C 5/16* (2013.01); *B64C 9/12* (2013.01); *B64C 15/12* (2013.01); *B64C 25/52* (2013.01); *B64C 39/024* (2013.01)

(58) Field of Classification Search
CPC ......... B64C 29/0033; B64C 5/16; B64C 9/12; B64C 15/12; B64C 25/52; B64C 39/024
See application file for complete search history.

(56) References Cited

U.S. PATENT DOCUMENTS

| | | | | |
|---|---|---|---|---|
| 3,181,810 A | * | 5/1965 | Olson ................ | B64C 29/0033 244/66 |
| 3,259,343 A | * | 7/1966 | Roppel .............. | B64C 29/0075 244/12.4 |
| 3,592,412 A | * | 7/1971 | Glatfelter ........... | B64C 29/0033 244/7 A |
| 6,402,088 B1 | * | 6/2002 | Syrovy ................. | B64C 27/18 244/10 |
| 8,152,096 B2 | * | 4/2012 | Smith ................ | B64C 29/0033 244/12.4 |
| 8,505,846 B1 | * | 8/2013 | Sanders, II ............ | B64C 29/02 244/7 A |
| 8,733,690 B2 | * | 5/2014 | Bevirt ................ | B64C 29/0033 244/12.4 |
| 9,120,560 B1 | * | 9/2015 | Armer ................ | B64C 29/0008 |
| 9,187,174 B2 | * | 11/2015 | Shaw ..................... | B64C 27/28 |
| 2003/0062443 A1 | * | 4/2003 | Wagner .................... | B64C 3/56 244/12.3 |

(Continued)

*Primary Examiner* — Justin M Benedik
(74) *Attorney, Agent, or Firm* — Nadya Reingand

(57) ABSTRACT

This invention discloses an aerial device (AD) for manned or unmanned flight, comprising a fuselage main body coupled with two or more aerodynamic units via bearings. Each aerodynamic unit is independently moveable and controllable, and thus able to create their own unique aerodynamic vectors, all of which are combined in varying manners to control the flight of the AD. Each unit comprises a structural part, a thruster with a propeller, and a servo wing positioned behind the propeller. More aerodynamic units may be combined with the main body in order to create more control. The units may be programmed or controlled manually to offset or otherwise account for varying environmental conditions such as slope, wind, and turbulence. The apparatus may further be coupled with a PID controller with a multidimensional field of input and output parameters.

17 Claims, 8 Drawing Sheets

(56) References Cited

U.S. PATENT DOCUMENTS

| | | | | |
|---|---|---|---|---|
| 2004/0245374 | A1* | 12/2004 | Morgan | B64C 5/02 244/12.3 |
| 2012/0234968 | A1* | 9/2012 | Smith | B64C 29/0033 244/12.3 |
| 2013/0020429 | A1* | 1/2013 | Kroo | B64C 3/16 244/6 |

* cited by examiner

STABILIZED VTOL FLYING APPARATUS AND AIRCRAFT

FIELD OF THE INVENTION

This invention relates to manned and unmanned aerial devices or aircraft, more particularly to vertical take-off and landing (VTOL) aircraft and drones.

BACKGROUND OF THE INVENTION

Tilt-rotor aerial vehicles are well known and used both in military (e.g., Bell/Boeing V-22 Osprey) and in civilian applications (Bell Augusta BA-609). As is known to those skilled in the design of such vehicles, they suffer from various deficiencies, such as aeroelastic instability limiting their maximum speed, poor hover efficiency, excessive vibrations, and larger noise levels due to large prop-rotors.

To eliminate or reduce these deficiencies, several approaches have been considered by the prior art. One approach is stopping the rotors in forward flight and propelling the vehicle in such flight by other means, usually by jet engines fixed with the thrust vector substantially parallel to the direction of flight, as have been described in the prior art (see, e.g., US patent documents 2010/0072325, and U.S. Pat. Nos. 5,085,315, 3,592,412, 3,404,852). The aircraft described therein are designed to operate in cruise mode such that the blades of stopped tilt-rotors are folded to minimize the drag.

Folding the blades results in rotor complexity. Thus, another prior art disclosure (U.S. Pat. No. 4,979,698) uses unfolded rotors that are stowed behind the fixed wings and feathered to provide added lift while the aircraft is wing borne. As the tilt-rotors in this case are not powered, they cannot be used for Vertical Take-Off and Landing (VTOL), however, this design is intended to give a high speed jet propelled aircraft only a Short Take-Off and Landing (STOL) capability.

Another patent (U.S. Pat. No. 3,797,783) discloses aircraft with a pair of wing tip mounted tilt-rotors (rotary wings) that are driven for VTOL and tilted, feathered, and stowed in forward flight such that the feathered rotary wings form an operative extension of the fixed wing.

Yet another peculiar group of rotorcraft with some commonality to the disclosed invention are those with forward (canard) tilt-rotors/tilt-wings and stoppable main VTOL rotary wings (see, e.g., U.S. Pat. No. 7,665,688 or WO/2007/014531). The main rotary wings in these designs, however, are not tiltable.

Also well known are Quad Tilt-Rotor (QTR) or quad tilt-wing aircraft (see, e.g., U.S. Design Pat. No. D453,317, U.S. Pat. No. 7,004,426, US Patent Publication No. 2005/0230519, and U.S. Pat. No. 4,982,914), and one design with rotors that are meant to be stopped in flight is disclosed in U.S. Patent Publication No. US 2011/0001020 A1.

SUMMARY OF THE INVENTION

The present invention discloses a flying apparatus, comprising a main body comprising a fuselage beam, said main body being fixed, two or more aerodynamic units connected to said main body via one or more bearings, each aerodynamic unit being independently moveable in relation to said main body, each aerodynamic unit comprising a structural part, a thruster having a propeller, and a servo wing, said servo wing being positioned behind the propeller, wherein each aerodynamic unit is configured to create an individual aerodynamic vector based on a position of said structural part and based on a power of said thruster, wherein a desired flight pattern is initiated by a combination of all said individual aerodynamic vectors.

In some aspects, each aerodynamic unit is configured to create equal aerodynamic vectors.

In some aspects, each aerodynamic unit is configured to create unequal aerodynamic vectors.

In some aspects, one or more bearings defines a degree of freedom for rotation of said aerodynamic unit.

In some aspects, the aerodynamic units are freely rotating.

In some aspects, the aerodynamic units are rotated via mechanical means.

In some aspects, there are at least four aerodynamic units.

In some aspects, the aerodynamic units are configured to stabilize the apparatus in uneven environmental conditions, each aerodynamic unit maneuvering based on an instantaneous environmental factor.

In some aspects, the apparatus remains in steady state flight mode.

In some aspects, the main body comprises a biplane design.

In some aspects, the main body comprises a tandem biplane design.

The apparatus of claim 1, wherein the main body comprises a longitudinal triplane design.

In some aspects, the apparatus is coupled to a processor using a proportional-integral-derivative controller with a multidimensional field of input parameters.

BRIEF DESCRIPTION OF THE DRAWINGS

FIG. 2 shows how the wings and propellers of the aircraft may be manipulated to cause the aircraft to move in a different direction.

DETAILED DESCRIPTION OF THE PREFERRED EMBODIMENT

Definitions

"Steady-state flight mode," or "SSFM," as used herein, is defined as steady and non-oscillating flight of any kind of aerial vehicle or device, manned (e.g., airplanes) or unmanned (e.g., drones). SSFM is the simplest case of flight, and control of aerial vehicles in SSFM is the preferred embodiment of the present invention. Additional embodiments of the aircraft of the present invention may cover dynamic flight modes which are more complex than SSFM.

"Servo wing(s)," as used herein, is (are) defined as a second flap or otherwise rotatable portion of an aerodynamic unit, located behind the front wing and propeller, and usually on or near the trailing edge of said aerodynamic unit.

The aerial device ("AD") of the present invention comprises a flying device design, which is supported in the air using aerodynamic modules. The device may be arranged in different designs—biplane, tandem biplane, longitudinal triplane, and others. The modules may be energy-independent, may have their own control and stabilization systems, and may have mechanical connections to the aerial device ("AD") body that restrict certain kinematic degrees of freedom.

Figure 1:
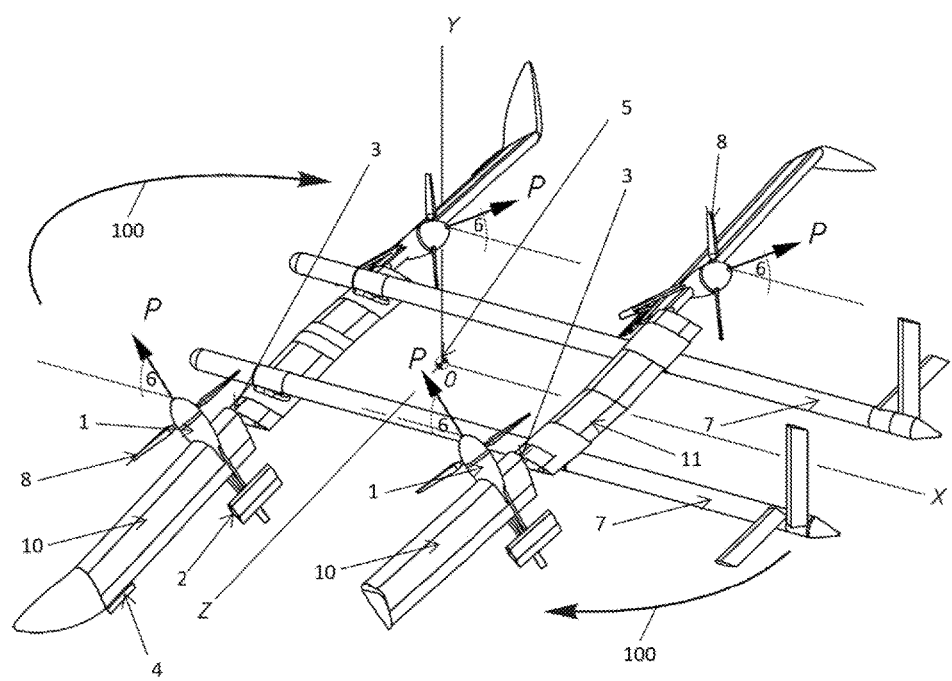
FIG. 1 shows one embodiment of the aircraft of the present invention.

FIG. 1 shows the details of one embodiment of the AD of the present invention. The device in FIG. 1 comprises 4 aerodynamic units. Each aerodynamic unit further comprises a structural part (i.e. wing) 10, a thruster 1 with a propeller 8, and a servo wing 2 coupled to the trailing end of the thruster 1. Some aerodynamic units may further comprise an aileron 4. Each aerodynamic unit moves individually (e.g., rotates individually about the Z-axis) via the connection comprising a bearing 3 such that each aerodynamic unit may be manipulated to create an aerodynamic vector (i.e., a force dependent on the speed of each propeller 8 and the angle 6 at which each aerodynamic unit is tilted), each said aerodynamic vector in turn acting in combination on the main body 11 of the AD. The bearing 3 may further be configured to restrict the rotation of the aerodynamic unit to certain angles or to provide set degrees of freedom. The main body 11 of the AD is defined as that portion of the AD which is fixed, including the fuselage beams 7. The center of gravity 5 of the AD is located at or near the center of the main body 11. When the aerodynamic units of the AD are positioned as shown in FIG. 1, the combination of vectors acting on the AD causes the AD to spin in a clockwise direction, as depicted by the arrows 100. Movement of the AD along the Y-axis depends on the speed of the propellers 8 and environmental factors.

Figure 2:
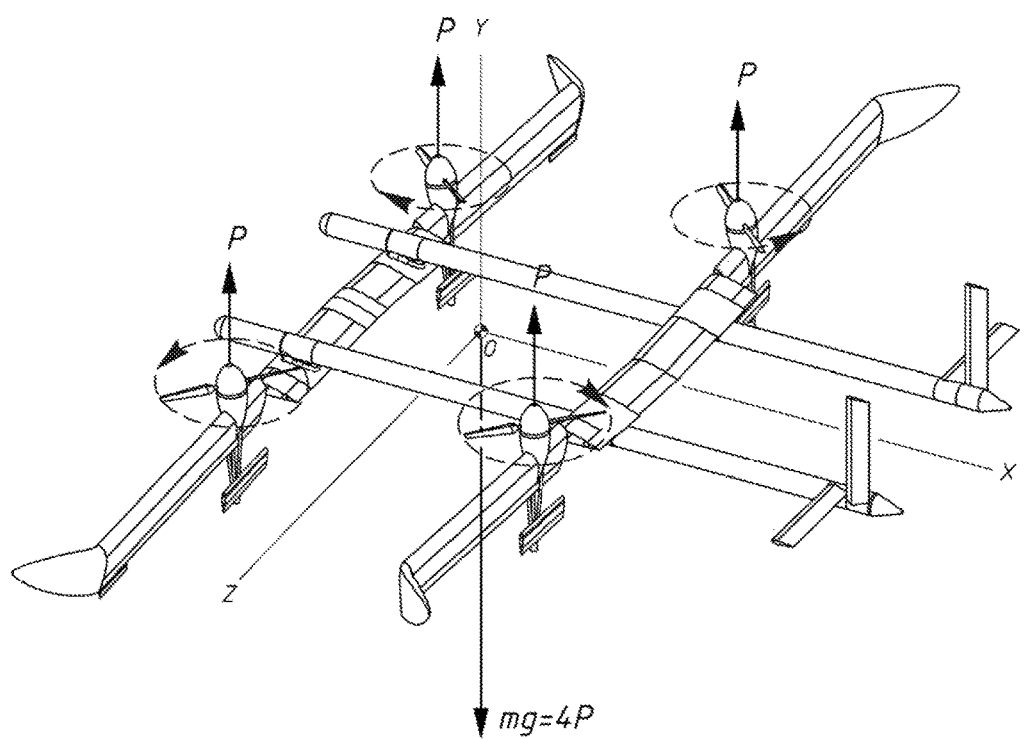
FIG. 2 shows a second view of the embodiment in FIG. 1.

FIG. 2 shows the same embodiment as FIG. 1 but wherein the aerodynamic units are each positioned such that the thrusters 1 each point directly upward. FIG. 2 shows two propellers rotating clockwise and two propellers rotating counter-clockwise, wherein no adjacent propeller rotates in the same direction. Such positioning of the aerodynamic units provides an example of transitional flight mode of the AD.

Figure 3:
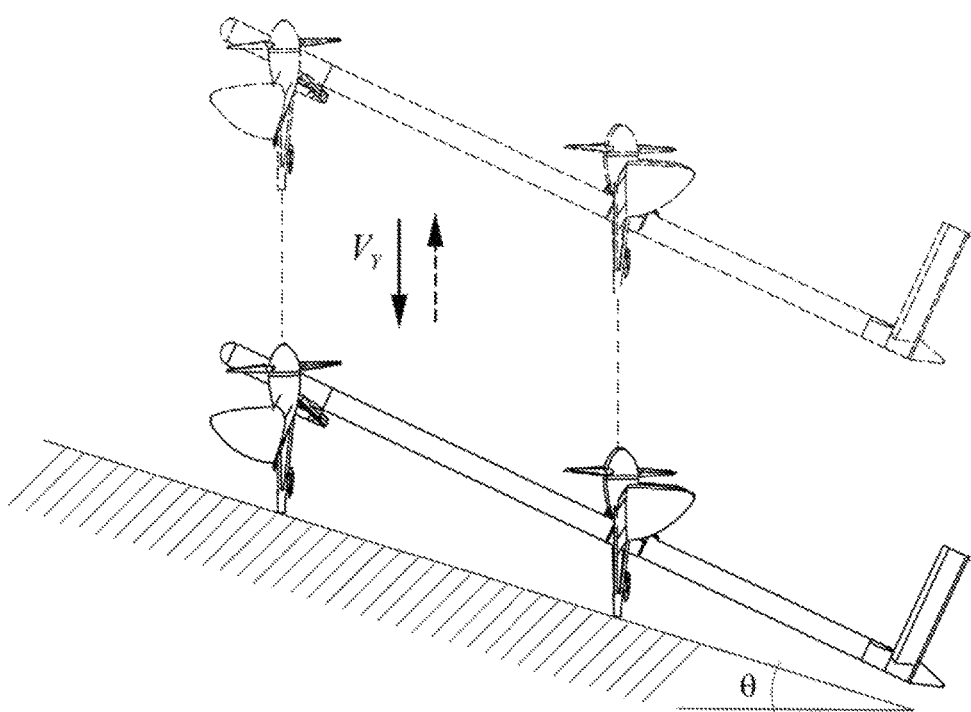
FIG. 3 shows another embodiment of the present invention, wherein wings are manipulated such that the aircraft may land on a sloped surface.

FIG. 3 shows how the aerodynamic units of the AD may be manipulated to allow the AD to land on a surface with a slope. The tail end of the thruster 1 further acts as landing gear for the AD.

Figure 4:
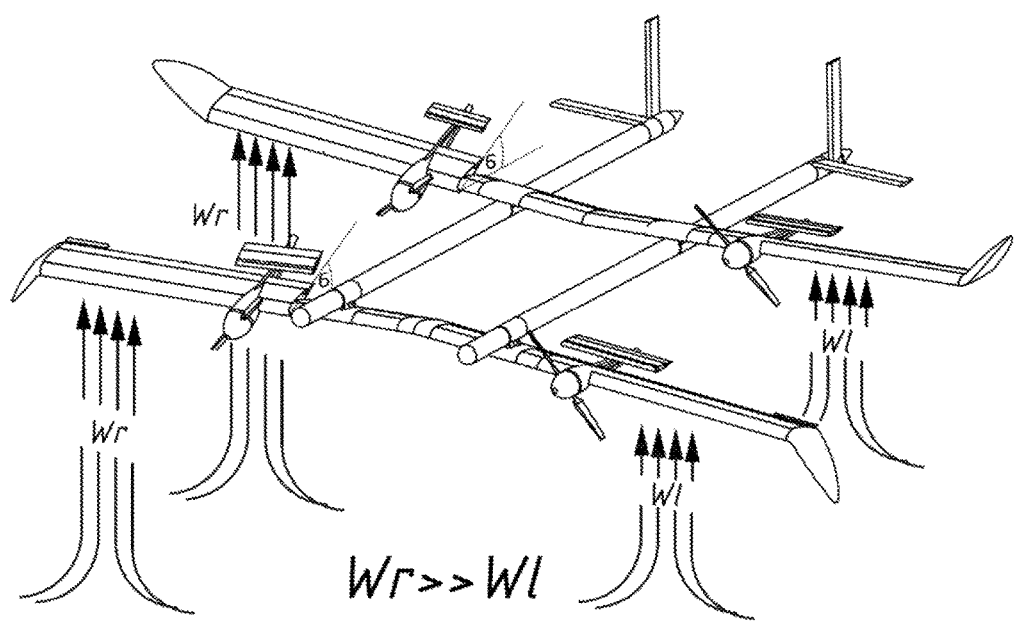
FIG. 4 shows how one set of wings may rotate relative to another set of wings depending on wind and turbulence conditions, such that the aircraft becomes stabilized even when the environmental conditions are unequal across the body of the aircraft.

FIG. 4 provides an example of how individual aerodynamic units may be positioned or rotated in different manners in order to stabilize the AD in varying environmental conditions. Specifically, FIG. 4 shows a first wind force on one side of the AD (Wr) which is much greater than (>>) a second wind force on another side of the AD (Wl). In order to compensate for the variation in forces, one side of aerodynamic units of the AD are tilted to counteract the additional force from the wind on that side, as shown in the figure. Such individual manipulation may occur with any combination of aerodynamic units, thus allowing the aircraft to maintain a desired flight or hovering pattern in any type of environmental condition.

Figure 5:
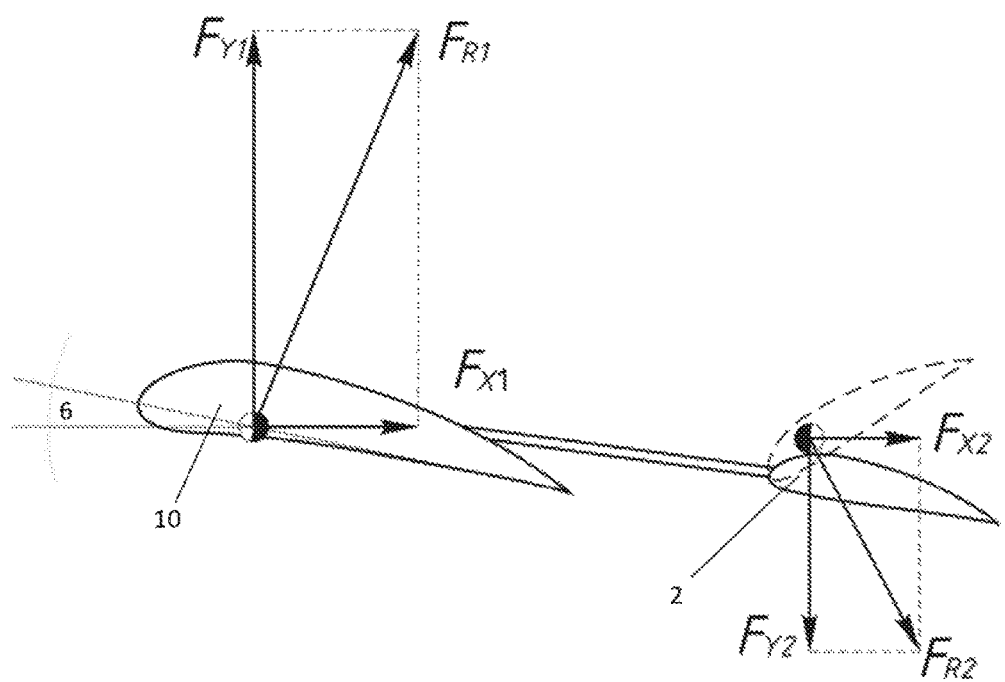
FIG. 5 shows how the servo wing may maneuver in relation to the front wing to form an offset aerodynamic surface and/or to assist the rotation of the front wing.

FIG. 5 shows the relationship between the servo wing 2 and the structural part (e.g., wing) 10 of each aerodynamic unit. The servo wing 2 is tiltable to make rotation of the structural part 10 less arduous. Due to the fact that the servo wing 2 is located near the trailing end of the aerodynamic unit, and particularly as an attachment behind the structural part 10, a tilt of the servo wing 2 in turn causes an equal and opposite force on the structural part 10. This makes it easier for the aerodynamic unit to tilt without requiring more power or energy to be installed within the AD. Without the servo wing 2, additional resources would be required to maneuver the aerodynamic unit into a desired position during flight.

Figure 6:
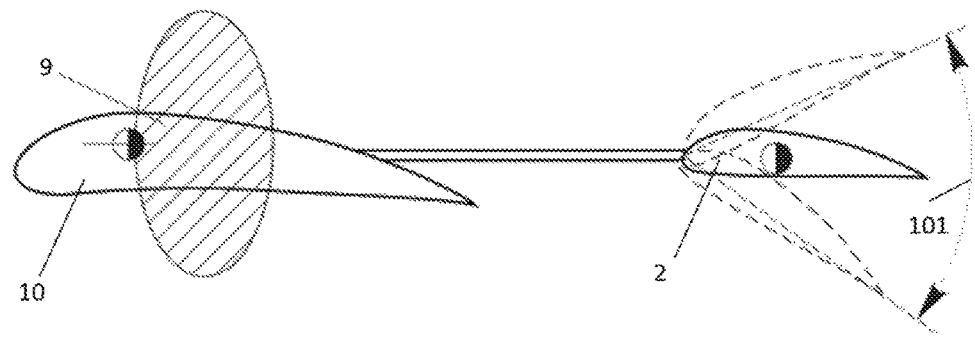
FIG. 6 shows the range of rotation for the servo wing as well as the virtual focus area of the front wing, which is based on the range of rotation of the servo wing.

FIG. 6 shows the same relationship as FIG. 5 and further illustrates an exemplary range of rotation 101 for the servo wing 2, as well as the virtual focus point 9 of the structural part 10 of the aerodynamic unit. The virtual focus point 9 is dependent on the range of rotation 101 for the servo wing 2, as the servo wing 2 is positioned in the slipstream created by the structural part 10.

Figure 7:
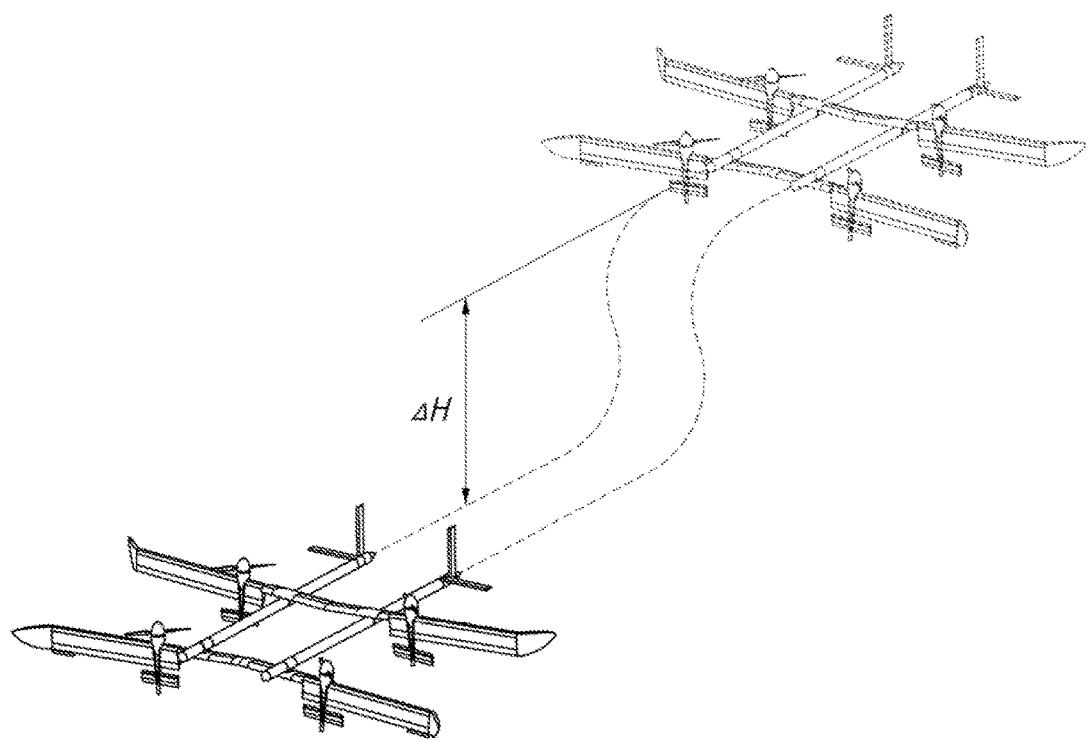
FIG. 7 shows an example of how the wings and rotors of the aircraft of the present invention may be used to cause the aircraft to increase vertical position.
Figure 8:
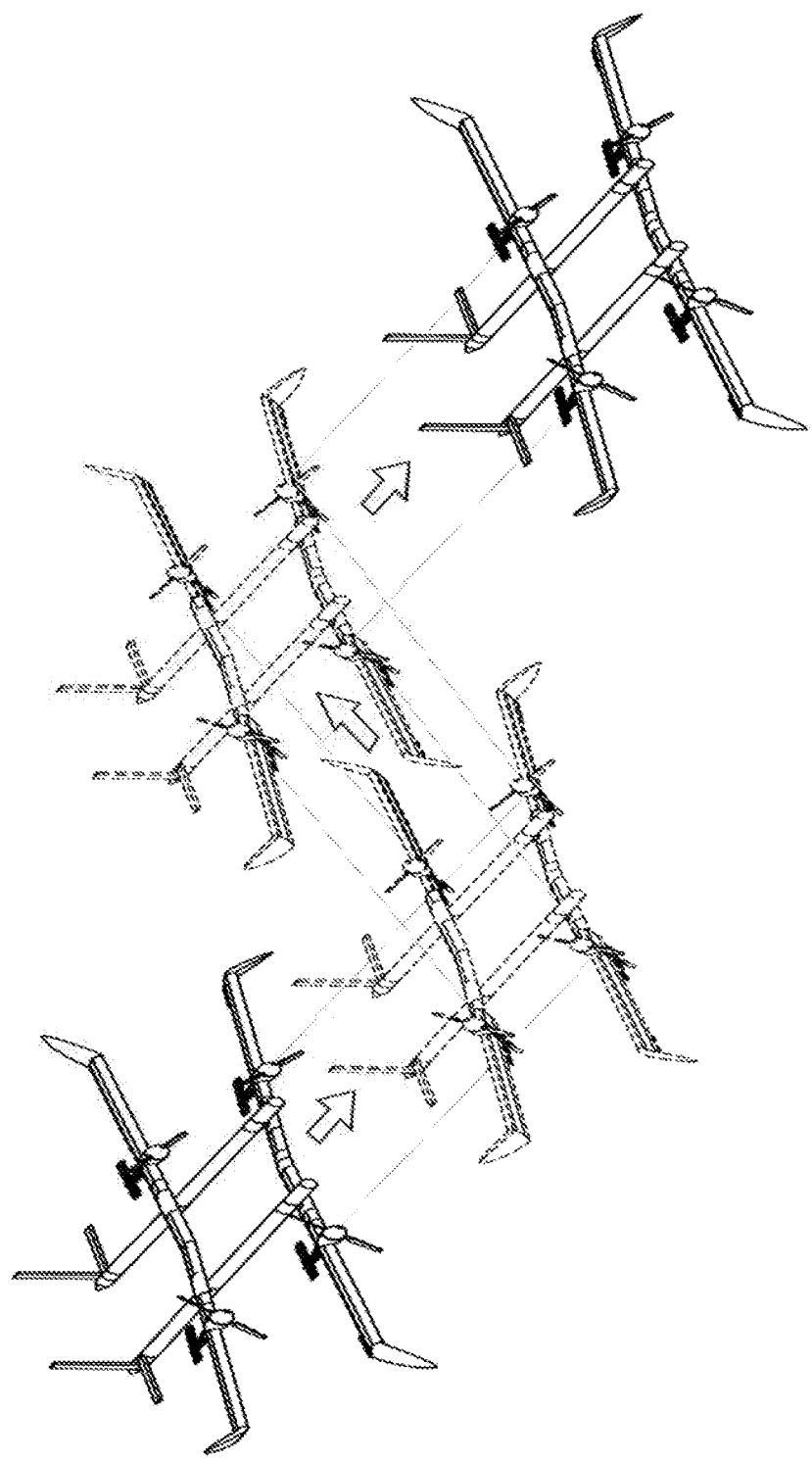
FIG. 8 shows an example of how the aircraft of the present invention shifts from sustained flight mode to transitional flight mode and vice versa.

FIG. 7 shows how the AD may be manipulated in order to cause a movement along the Y-axis (delta H). FIG. 8 shows how the AD may be manipulated in order to shift from sustained flight mode to transitional flight mode and back to sustained flight mode. It should be noted that any manipulation of one or more aerodynamic units may be performed including but not limited to those shown in the figures. Varying manipulations and relative positions of the aerodynamic units will cause the AD to move at varying speeds and in varying directions as particularly desired for the application at hand.

Stability Module Types

In steady-state flight mode, the AD modules are stabilized by one of the proposed methods:

Electronic stability module: using a proportional-integral-derivative controller with a multidimensional field of input parameters.

The present invention may further employ a PID controller (proportional-integral-differential controller) with an input and output parameter field for implementation of a control system with artificially specified stability parameters.

Aerodynamic stability module: a system, composed of two or more profiles, aerodynamically similar to the conventional S-shaped airfoil, wherein the moment characteristics are controlled by rotating one or more profiles, and stabilization in the air current is achieved by the resultant moment characteristics and aerodynamic momentum curve of the system as a whole.

Mechanical and/or emergency stability module: direct manual control of the servo wings, potentially coupled with a partial blocking of one or more of the system's degrees of freedom, in a mechanically or aerodynamically stable position. Alternatively, this module is employed without partial blocking of degrees of freedom, which allows for controlled flight during a partial failure of the system components.

The proposed design for constructing the AD involves the use of direct vector control of the full aerodynamic force, which creates several advantages over traditional AD designs. Direct vector control comprises controlling the total aerodynamic force affecting the device, which in turn controls the acceleration of the device, both linear and angular. Direct vector control is implemented by splitting an AD into individual aerodynamic units and controlling the aerodynamic properties of each unit separately. Direct vector control is more energy efficient and more effective than controlling via a single-aerodynamic-unit vehicle, which causes unnecessary stress to the structure and requires more energy. By creating separate aerodynamic units which are connected via mechanical and electrical means, each unit can be individually controlled to balance and stabilize the AD during flight, regardless of environmental factors such as wind, turbulence, and other obstacles.

The full aerodynamic force of a device is defined as the sum of the aerodynamic force of all individual aerodynamic units. In contrast to traditional designs which imagine aerial devices as a single complete device, whose stability is not split among individually moveable parts, the present invention utilizes individually controllable aerodynamic units. The units may be uniform or non-uniform, depending on the particular embodiment. Each such aerodynamic unit comprises one or more thrusters 1 comprising a propeller 8 and one or more structural parts (e.g., a wing) 10. Because the units comprise both a thruster 1 and a structural part 10, the design of the present invention creates an aerodynamic force in addition to thrust. The present invention further allows for a control of the degrees of freedom of each individual aerodynamic unit via a connection comprising a bearing 3 between the structural part 10 and main body 11 of the aircraft.

Types of Flight Control

Vertical takeoff and landing. In one embodiment, the invention comprises a device with the ability to control flight through modules similar to the multicopter type. This is achieved at least in part by limiting the degrees of freedom of aerodynamic units, or locking them in a particular position, either mechanically or via control systems.

Additional control possibilities in a hover mode. Asymmetrical module deviation allows control of AD position around the Z-axis and movement along the X-axis (see FIG. 2). By adding one or more degrees of freedom to at least one aerodynamic unit, and controlling that degree of freedom using any of the control methods described herein, the AD may be maneuvered to meet any condition in order to maintain the AD in a desired position. It should be noted that such control possibilities in a hover mode is one of multiple dynamic flight modes which are achievable via the general structure of present invention.

Pitch angle control. Additionally, unlike conventional multicopters, the present invention allows hovering, flight, and landing on a slope with virtually any pitch, limited only by the design features of a particular AD (see FIG. 3).

Unlimited increase of wing elongation. Greater wing length decreases induced drag and allows for creation of very high-performance aerial devices. The main limitation of modern tilt-rotor planes is associated with the dependence of wing design on the type of power unit and its location. In the present invention, this dependence is absent. Generally, restrictions to wing elongation are based on the strength and stiffness of the wing console. For example, sailplanes have a wing length that is limited by torque stiffness and bending stiffness. The design of the present invention eliminates the torque load and thus the limit on wing elongation. In conventional designs, powerful torque servo drives, comprising strong and stiff fittings and material, are required to turn the wings. In the present invention, however, separately turning power drives are unnecessary. Instead, the entire structure is controlled using a module of aerodynamic balance, wherein each separately controlled aerodynamic unit comprises a main thruster, without any additional power units being required for the AD. Because the torque stiffness of the wing is no longer critical, the aspect ratio of the wings of the device of the present invention has theoretically no limit.

Nearly complete absence of torsional stress in the wing design. This feature allows for optimal lightening of the wing, simplification of its design, and application of modern high-strength materials. In the present invention, each wing 10 rotates freely on the bearing 3, and thus no torque is transferred to the main body 11 of the AD. The control system employed by the device of the present invention completely compensates for the torsional moment characteristics by changing the aerodynamical moment characteristics.

Ability of the automated module control system software to compensate for inaccuracies in aerodynamic module manufacturing. This feature allows for design simplification and reduction in cost of production. This function may, for example, be implemented algorithmically via automated software.

Ability to automate damping of loads associated with atmospheric turbulence. This is a constructive possibility that exceeds the abilities of conventional systems due to the lower order of magnitude of moments of inertia of aerodynamic modules relative to the whole AD. In conventional designs, the aerodynamic forces of aerial devices causes linear and angular acceleration of the entire device. With such devices, the turbulence and other forces affecting the device are compensated at best by possibly bending the wings, if possible, and/or turning the whole device to change an angle of flight. Changing these factors, in turn, causes a change in the full aerodynamic force of the device, including linear and angular acceleration. In the device of the present invention, the total aerodynamic force is caused by the combination of separate units, each of which is self-stabilized. The only type of interference between units of a whole device is that which is controlled and intended by a user of the device. The degrees of freedom of each unit can be individually expanded or restricted, either statically or dynamically. Furthermore, the size of each unit may be decreased linearly, which causes, eg., a quadratic decrease of the inertial moment, making the device faster and easier to control. Moreover, only a controlled force (e.g., specific direction and strength) is transferred to the body of the device, due to the fact that each unit is attached having degrees of freedom via one or more bearings 3. Thus, the units may move freely in varying environmental conditions while the body of the vehicle remains relatively to completely steady.

Ability to vertically maneuver the AD without changing the pitch angle. Direct vector control of the full aerodynamic force of the AD makes it possible to limit AD movement along certain axes, reduce overloads in these directions to practically zero, which allows unloading of the AD assembly as well as creating more favorable conditions for equipment and structure of the AD. The full aerodynamic force is generally defined as the vector sum of the vectors of the aerodynamic forces of each part of the device, most of which are controllable thruster-plus-structure units. By controlling the individual aerodynamic units of the device, a user is able to control the sum of those parts and thus the full aerodynamic force of the device. It should be noted that uniform control of each aerodynamic unit is not mandatory and thus each unit may move individually and differently depending on the environmental conditions, desired flight, and desired positioning of the device.

Modules.

Control of the virtual focal point position of a given aerodynamic module can be implemented using the following structural elements, any of which may be combined within a single device according to the present invention:

Offset Aerodynamic Surface (Servo Wing).

In a preferred embodiment, an additional flap or wing, a servo wing 2, may be coupled to the aerodynamic unit, located towards the trailing edge of a wing or otherwise rotating structure 10 comprising the aerodynamic unit. The servo wing 2 may be maneuvered to change the momentum curve of a thruster 1-plus-structure 10 aerodynamic unit, allowing for self-stabilization of said unit on different angles of attack. The servo wing 2 may also be used as an effective torque drive to direct electronic control of said unit's position and movement, with or without sensors and % or a control unit. This essentially forms a further adaptive wing or other structure coupled to a thruster, creating an additional manner for directly controlling the full aerodynamic force vector of the device.

Conventional Flap on the S-Shaped Profile.

In addition to a servo wing 2, an aerodynamic unit may also comprise a conventional flap, located in front of the servo wing. The conventional flap may change the airfoil shape and the momentum curve of the airfoil, and thus it may be maneuvered to control/change an angle of attack of an aerodynamic unit. A splittable differential brake flap may further be included in the design of one or more aerodynamic units, being maneuverable to further control/change an angle of attack of the aerodynamic unit and device as a whole.

Shifting of Module Rotation Axis.

By changing the module rotation axis either linearly or angularly, or both, the relative position of the aerodynamic center of any aerodynamic unit of the device can be shifted. The axis may also be shifted to control wing stability or maintain the aerodynamic unit in a particular position.

Direct drive of module (torque).

Control of wing sweep.

Control of wing "twist" and other methods for focus control.

Control of the mutual position of the suspension points or the axis of the aerodynamic unit, as well as the aerodynamic center of the module. By controlling the position, angle, and vector of each aerodynamic unit, the present invention is able (1) to stabilize the module in a determined position relative to the AD body and/or the oncoming airstream, (2) to control the full aerodynamic force applied to the module, and (3) consequently, within limits, to control the vector of the full aerodynamic force of the entire AD.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A flying apparatus, comprising:
    a main body comprising a fuselage beam, said main body being fixed,
    two or more aerodynamic units connected to said main body via one or more bearings, each aerodynamic unit being independently moveable in relation to said main body, each aerodynamic unit comprising:
        a structural part comprising a wing,
        a thruster having a propeller, and
        an aerodynamic flap positioned behind the propeller and beyond a trailing edge of the wing, said aerodynamic flap being coupled to the wing,
    wherein each aerodynamic unit is configured to create an individual aerodynamic vector based on a position of said structural part and based on a power of said thruster,
    wherein a desired flight pattern is initiated by a combination of all said individual aerodynamic vectors.

2. The apparatus of claim 1, wherein each aerodynamic unit is configured to create equal aerodynamic vectors.

3. The apparatus of claim 1, wherein each aerodynamic unit is configured to create unequal aerodynamic vectors.

4. The apparatus of claim 1, wherein said one or more bearings defines a degree of freedom for rotation of said aerodynamic unit.

5. The apparatus of claim 1, wherein said aerodynamic units are freely rotating.

6. The apparatus of claim 1, wherein said aerodynamic units are rotated via mechanical means.

7. The apparatus of claim 1, comprising at least four aerodynamic units.

8. The apparatus of claim 1, wherein the aerodynamic units are configured to stabilize the apparatus in uneven environmental conditions, each aerodynamic unit maneuvering based on an instantaneous environmental factor.

9. The apparatus of claim 1, wherein the apparatus remains in steady state flight mode.

10. The apparatus of claim 1, wherein the main body comprises a biplane design.

11. The apparatus of claim 1, wherein the main body comprises a tandem biplane design.

12. The apparatus of claim 1, wherein the main body comprises a longitudinal triplane design.

13. The apparatus of claim 1, wherein said apparatus is coupled to a processor using a proportional-integral-derivative controller with a multidimensional field of input parameters.

14. The apparatus of claim 1, wherein the aerodynamic flap of at least one aerodynamic unit is positioned in line with the propeller of said at least one aerodynamic unit.

15. The apparatus of claim 1, wherein each aerodynamic flap allows for self-stabilization of each aerodynamic unit.

16. The apparatus of claim 1, wherein each aerodynamic flap is a servo wing.

17. The apparatus of claim 1, wherein each aerodynamic flap is positioned in a slipstream created by its corresponding structural part.

\* \* \* \* \*